(12) United States Patent
Kybarshi et al.

(10) Patent No.: US 11,302,172 B2
(45) Date of Patent: Apr. 12, 2022

(54) IDENTIFICATION OF CAP OR COVER ON A DETECTOR

(71) Applicant: Carrier Corporation, Palm Beach Gardens, FL (US)

(72) Inventors: Eranna Kybarshi, Telangana (IN); Ramana Babu Kalagani, Telangana (IN); SirishaDL Challa, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/115,222

(22) Filed: Dec. 8, 2020

(65) Prior Publication Data

US 2021/0183226 A1 Jun. 17, 2021

(30) Foreign Application Priority Data

Dec. 11, 2019 (IN) .............................. 201911051253

(51) Int. Cl.
| G08B 21/18 | (2006.01) |
| G08B 3/10 | (2006.01) |
| H04W 4/12 | (2009.01) |

(52) U.S. Cl.
CPC ............... *G08B 21/18* (2013.01); *G08B 3/10* (2013.01); *H04W 4/12* (2013.01)

(58) Field of Classification Search
CPC ........ G08B 1/00; G08B 21/18; G08B 17/113; G08B 29/14; G08B 29/145; G08B 29/046; G06F 1/00; H04W 4/12
See application file for complete search history.

(56) References Cited

U.S. PATENT DOCUMENTS

| 7,791,475 | B2 | 9/2010 | Clow |
| 10,102,053 | B2 | 10/2018 | Jayaraman et al. |
| 10,339,793 | B2 | 7/2019 | Moffa |
| 2013/0187781 | A1* | 7/2013 | Bach .................. F24C 15/2064 340/584 |
| 2014/0084165 | A1* | 3/2014 | Fadell ...................... H01H 9/02 250/340 |
| 2016/0106174 | A1 | 4/2016 | Chung et al. |
| 2017/0061747 | A1 | 3/2017 | Christianson et al. |
| 2018/0018213 | A1* | 1/2018 | Jayaraman ......... G05B 23/0267 |
| 2019/0226915 | A1 | 7/2019 | Zhang et al. |

FOREIGN PATENT DOCUMENTS

WO    2000062081 A1    10/2000

OTHER PUBLICATIONS

European Search Report for application EP 20208139.4, dated Jun. 11, 2021, 15 pages.
Partial European Search Report for application EP 20208139.4, dated Apr. 22, 2021, 17 pages.

* cited by examiner

*Primary Examiner* — Ojiako K Nwugo
(74) *Attorney, Agent, or Firm* — Cantor Colburn LLP

(57) ABSTRACT

A method, system and devices assisting the detection of a cover/cap. A method includes monitoring a status of a button installed on a detector. If there is any change in status of the button, it is reported to a controller. The controller issues a notification regarding the change of the status and transmits an alert to a control panel.

16 Claims, 5 Drawing Sheets

IDENTIFICATION OF CAP OR COVER ON A DETECTOR

FOREIGN PRIORITY

This application claims priority to Indian Patent Application No. 201911051253, filed Dec. 11, 2019, and all the benefits accruing therefrom under 35 U.S.C. § 119, the contents of which in its entirety are herein incorporated by reference.

TECHNICAL FIELD

The present invention relates generally to a safety device installation and maintenance. More particularly, the invention relates to an apparatus and method for detecting anomaly in fire alarm systems.

BACKGROUND

During new installations and building maintenance activities detectors, such as smoke, fire, hazardous gases detectors etc., are covered with a cover/cap to avoid fine air particles such as construction dust, painting fumes etc. entering into the detection chamber of the detectors. As long as a detector is covered with the cap, the air particles cannot enter the detection chamber and thereby disabling the detector from detecting smoke or fire or hazardous gas.

After the maintenance activity is completed or after installation of the detector, the installer needs to check the removal of the cover/cap manually. The detectors are connected to a control panel which displays whether the detectors are functioning normally. Even if the cover/cap is not removed, the control panel would still show "System Normal" message. This could cause serious life safety issues, wherein system fails to detect a real fire/smoke and may cause danger to the life and property.

Further, in a conventional device loop wiring arrangement, a fire control panel supports up to 250 addressable devices (for example) on a loop and a typical building comprises around 10 such loops (for example). Thus, in this example a technician needs to watch all the 2500 devices to see whether the cap is removed or not. It is a labor intensive task to watch each of the 2500 devices to identify if the cap is removed for proper functioning.

If the covered detector is installed in places of low visibility, such as above a false ceiling or below the false flooring, there is a chance that it goes unnoticed by the installer/user and the cover/cap on the detector may remain undetected.

The above instances and examples clearly indicate that it may be hazardous to leave any detector covered with a cap. Further, it is also manually intensive and time consuming to identify whether the cap from the detectors has been removed.

Therefore, there is a need in the art to develop methods and systems for identifying whether there is any anomaly associated with the detectors.

SUMMARY

Various embodiments of the invention describe a method of monitoring a status of a button installed on a detector. The method describes detecting a change in the status of the button and issuing a notification on detecting the change in status of the button. Further, the notification is transmitted to a control panel.

In another embodiment of the invention, the notification is received by the control panel, wherein the control panel issues an alert in response to the notification.

In an embodiment of the invention, the alert issued by the control panel is further transmitted to a mobile device.

In yet another embodiment of the invention, the button is electrically interfaced with a microcontroller for receiving the change in status of the button.

In another embodiment of the invention, the microcontroller is configured to issue the notification based on the detected change in status of the button.

In still another embodiment of the invention, the notification is transmitted directly to a mobile device.

In another embodiment of the invention, there is a change in status of the button when a cap is placed on the detector.

In still another embodiment of the invention, the cap is designed to be fixed on the detector such that the button changes the status when the cap is fixed with the detector.

In another embodiment of the invention, the alert is a message or an audio alarm and is executed on the control panel.

In another embodiment of the invention a detector a disclosed. A button is fixedly attached to the detector. The detector comprises a detection unit for detecting change in status of the button and a microcontroller for monitoring the change in status of the button and issuing a notification in response to change in the status of the button. Further, a communication unit is communicably coupled with the microcontroller for transmitting the notification.

In another embodiment of the invention, the notification is received by the control panel, wherein the control panel issues alert in response to the notification.

In yet another embodiment of the invention, the button is electrically interfaced with a microcontroller for receiving the change in status of the button.

In another embodiment of the invention, the microcontroller is configured to issue the notification based on the detected change in status of the button.

In still another embodiment of the invention, the notification is transmitted directly to a mobile device.

In an embodiment of the invention, there is a change in status of the button when a cap is placed on the detector.

In yet another embodiment of the invention, the cap is designed to be fixed on the detector such that the button changes the status when the cap is fixed on the detector.

In still another embodiment of the invention, the alert is a message or an audio alarm and is executed on the control panel.

In various other embodiments of the invention a computer readable medium is disclosed comprising one or more processors and a memory coupled to the one or more processors. The memory stores instructions which are executed by the one or more processors to identify one or more detectors with anomaly. The instructions are executed to monitor a status of a button installed on a detector and to detect a change in the status of the button. A notification is issued on detecting the change in status of the button and the notification is transmitted to a control panel.

In an embodiment of the invention, the microcontroller is configured to issue the notification based on the detected change in status of the button.

In yet another embodiment of the invention, the notification is transmitted directly to a mobile device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Figure 1:
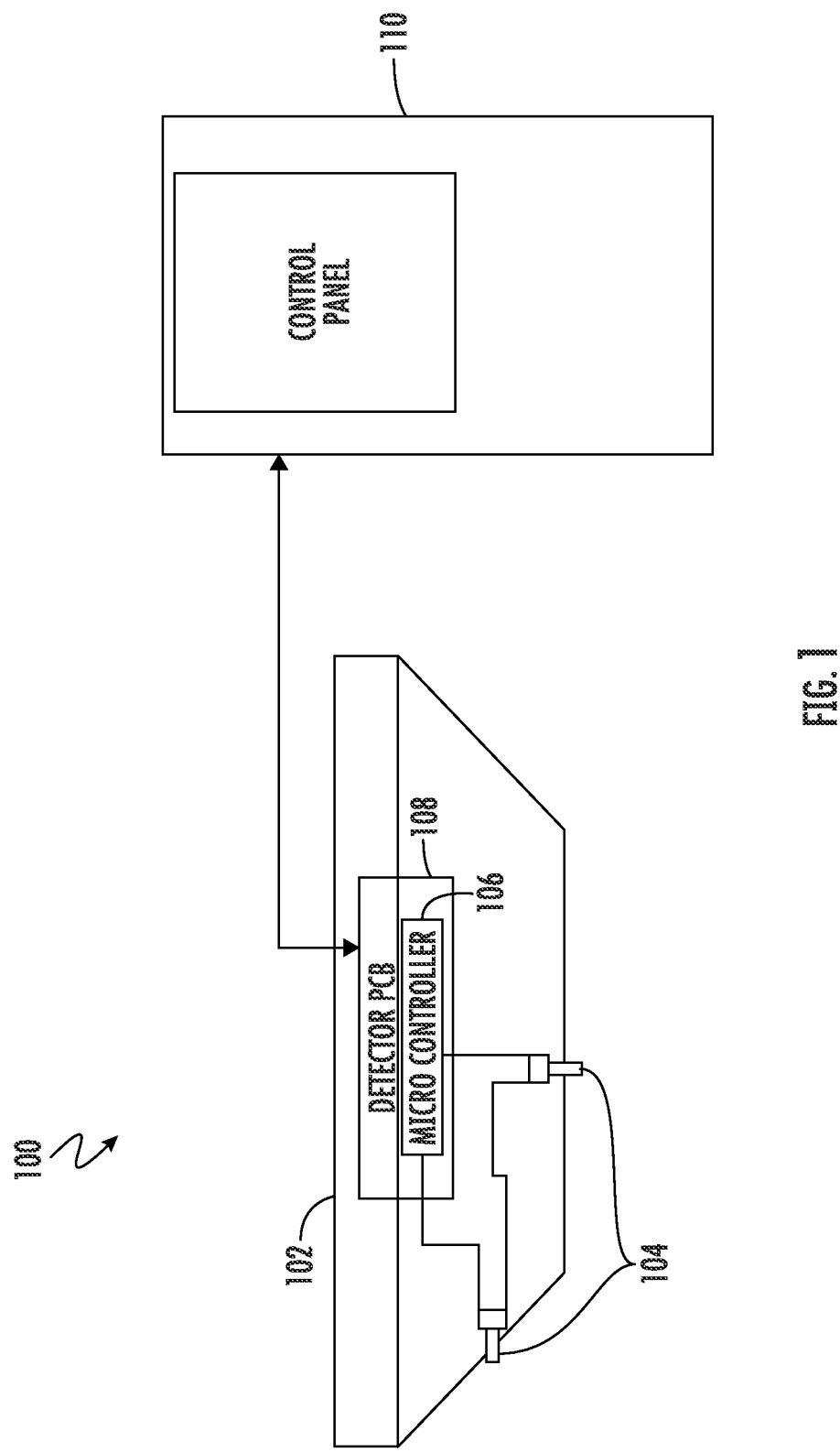
FIG. 1 is an exemplary diagram illustrating a system in accordance with an embodiment of the invention without a cap.

Described herein is the technology with systems, methods, and devices for identifying whether one or more detectors installed in buildings, large premises, airports, shopping malls, museums and the like are covered with a cover or cap. In different embodiments of the invention a button associated with each detector is monitored for change in status. In case there is a change in status of the button, it is detected by the detector and a notification is generated. The notification is transmitted to a control panel. The control panel is associated with one or more detectors and each of the one or more detectors are capable of detecting the change in status of the button installed on each detector. In an embodiment of the invention, the status of the button may be changed when the cap or cover is fixed to the detector.

If the cap or cover is fixed on the detector, the button may change the status. The change in status is detected by a detection unit of the detector and is reported to a microcontroller. The microcontroller may issue an alert and transmit the alert to the control panel in response to the change in status of the button. The control panel may accordingly notify a concerned user by sounding an alarm or transmitting a notification to a user such as fire security personnel, Building Management System (BMS) team etc.

In an embodiment of the invention, the alert from the microcontroller may be directly transmitted to a mobile device of the concerned user or a facility manager.

As used herein, the detector may be capable of detection and evaluation of a cap or cover for any blockage associated with itself. The detectors are generally used to measure and evaluate the environmental parameters. In case a cap is placed on the detector, the detector may not function properly to evaluate the environmental parameters. The detector includes a button which is fixedly attached and installed on the detector. In the event of placement of a cap or cover, the status of the button may change which is reported to the microcontroller as described herein.

The button may also be in the form of a contactless switch which changes the status when a cap or cover is placed on the detector. The contactless switch may work when an infrared (IR) light of the switched is blocked by the placement of the cap or cover. The blocking of light may be termed as change in status of the switch. Various other types of contactless switches are within the scope of the invention. Alternatively, the switch may be a contact switch which changes the status when the switch is depressed on fixing the cap/cover on the detector. The button associated with the detector may be a tactile push button, a toggle switch, limit switch, a proximity switch, selector switch, and the like.

The concerned user or a facility manager may be associated with a particular control room which may be notified by the control panel regarding the alert or the fire alarm. In an exemplary embodiment, the alert triggered by the control panel may be associated with the cap or cover detected on the detector. The control room may have a team of people who may take an action to handle such anomaly. The concerned user or a facility manager may be a visitor of the premises, an employee of the premises, a security member of the premises, a trained Single Point of Contact (SPOC) of the premises, BMS team member of the premises or any such authorized person of the premises.

The one or more detectors described herein can be different types of devices for fire detection and/or hazardous gas detection such as smoke detectors, heat detectors, any gas detectors but not limited thereto. The control panel is capable of issuing controlling actions based on the type of detection obtained from the one or more detectors. The one or more detectors on sensing any specific signals according to their operation may transmit a report indicating the result of sensing. The control panel may take appropriate action based on the report by the one or more detectors. The result of sensing may be in the form of change in status of the button as described herein.

A plurality of detectors may be associated with a control panel which communicate with the control panel through a wired network or wireless network. Also, the detectors may be connected with each other in a loop. The detectors may comprise, but is not limited to, a transmitter, a receiver, a sensing unit, a memory and/or a processor.

As used herein, the alert issued by the control panel may be in the form of display on a display unit of the control panel. The alert may also be in the form of hooter or buzzer with the details of the detector on which cap or cover is placed. The alert may also be issued by the control panel and transmitted to a user device of the concerned user such as a mobile device. The control panel may transmit the details of the detector with anomaly. The details may include location information, indication of placement of cap or cover on the detector, unique identifier of the detector among other details.

The communication between one or more detectors and the control panel may be a wired communication, a cellular communication (such as Global System for Mobile (GSM) network, a Long-Term Evolution (LTE) network, a code-division multiple access (CDMA) network, a narrow-band internet of thing (NB-IoT) technique or category M1 technique)), a WiFi communication, a ZigBee communication or any such network or communication that is known in the art.

Turning now to figures, FIG. 1 depicts a system (100) for identifying whether a cap or cover is placed or attached to a detector (102). The detector includes a printed circuit board, PCB (108). The PCB comprises a microcontroller (106) which is electrically interfaced with a switch or button (104). If a cap or cover is placed on the detector, one or more of the buttons (104) may be depressed. The depression in the button is detected by a detection unit (not shown) on the detector (100) and signaled to the microcontroller (106) associated with the PCB (108). The depression of the button may be termed as "change in status" of the button. Alternatively, when the change in status of the button may be contactless. When a cover is placed on the detector, the cover may block the infrared (IR) light from the button and accordingly change in the status of the button is determined. This contactless change in status is reported to the microcontroller (106). The microcontroller (106) generates an alert on detecting the change in status of the button. The alert may be transmitted to a control panel (110) associated with the detector (100). The alert may be directly transmitted on a mobile device of a concerned user such as a technician or a facility manager.

The user terminal can be any hand held device such as a smartphone or a tablet and the like with at least a display, a storage unit and network connectivity. As an example, the hand held device may be an Apple® tablet or smartphone, an Android® tablet or smartphone, a Windows® tablet or smartphone and/or the like.

Figure 1A:
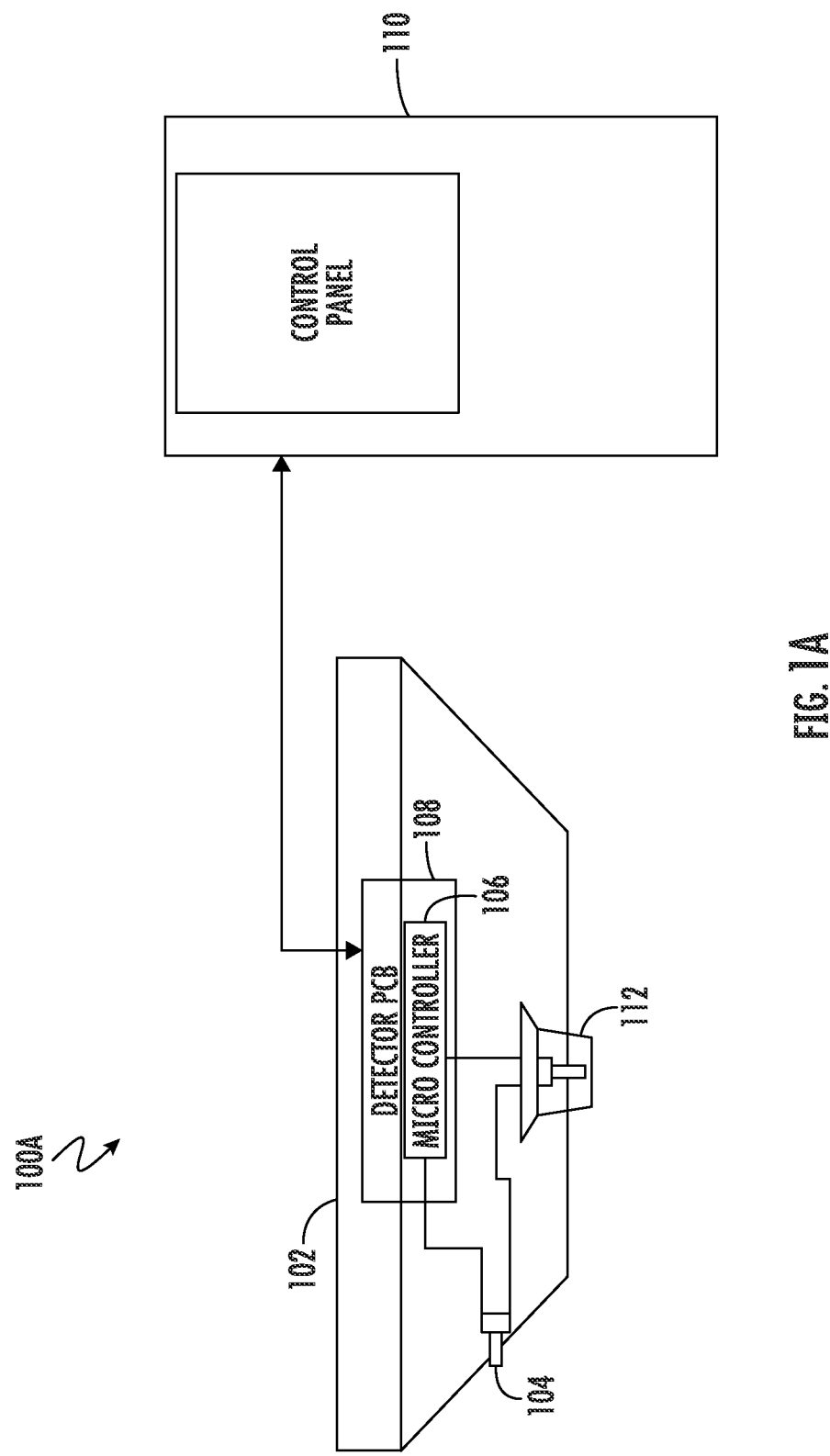
FIG. 1A is an exemplary diagram illustrating a system in accordance with an embodiment of the invention with placement of a cap.

FIG. 1A illustrates the embodiment of the invention as described in FIG. 1. FIG. 1A shows the placement of the cover or cap (112) which may depressed the button 104 and change the status of the button. As discussed above, change in status of the button may also be contactless.

Figure 2:
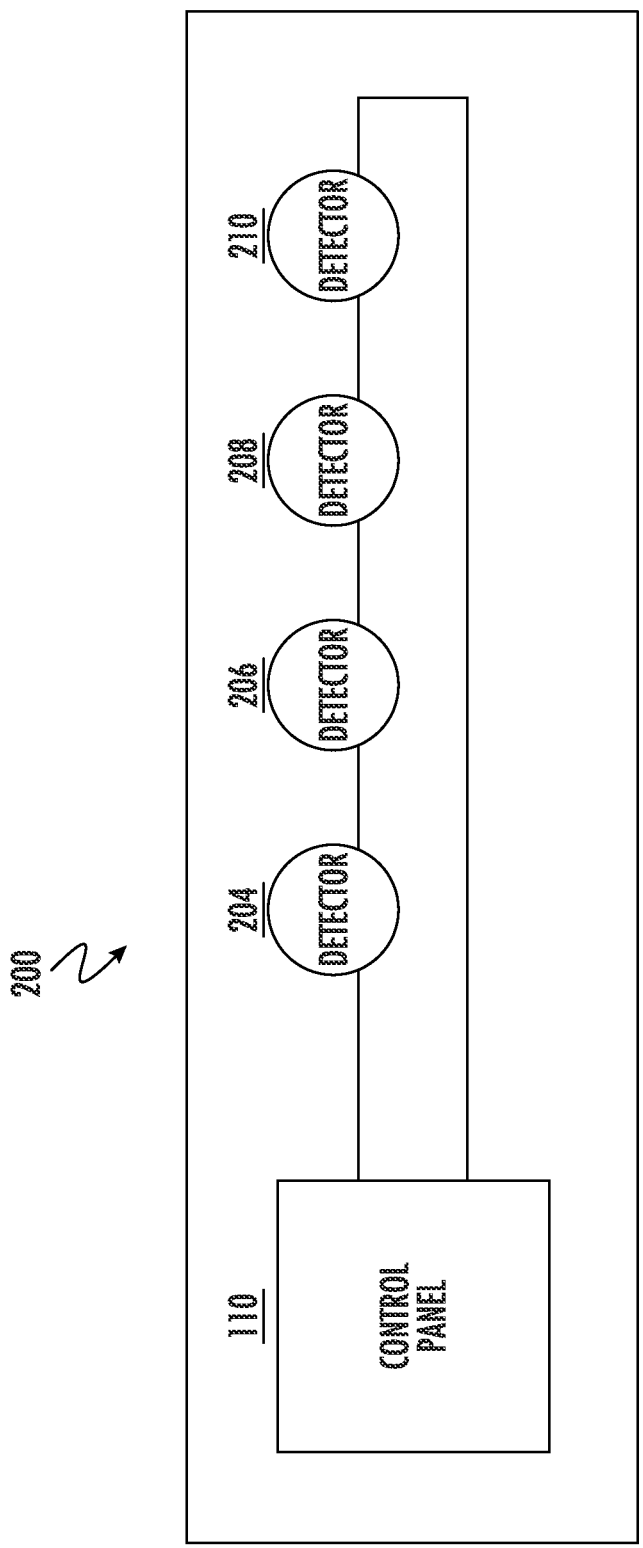
FIG. 2 is an exemplary diagram illustrating a system in accordance with another embodiment of the invention.

FIG. 2 depicts a system (200) where the control panel (110) is associated with a plurality of detectors (204, 206, 208, 210). Each of the detectors comprises a button which changes the status when a cap or cover is placed on the detector. The alert generated from any of the detector is transmitted to the control panel (110) or on a user mobile device directly.

Figure 3:
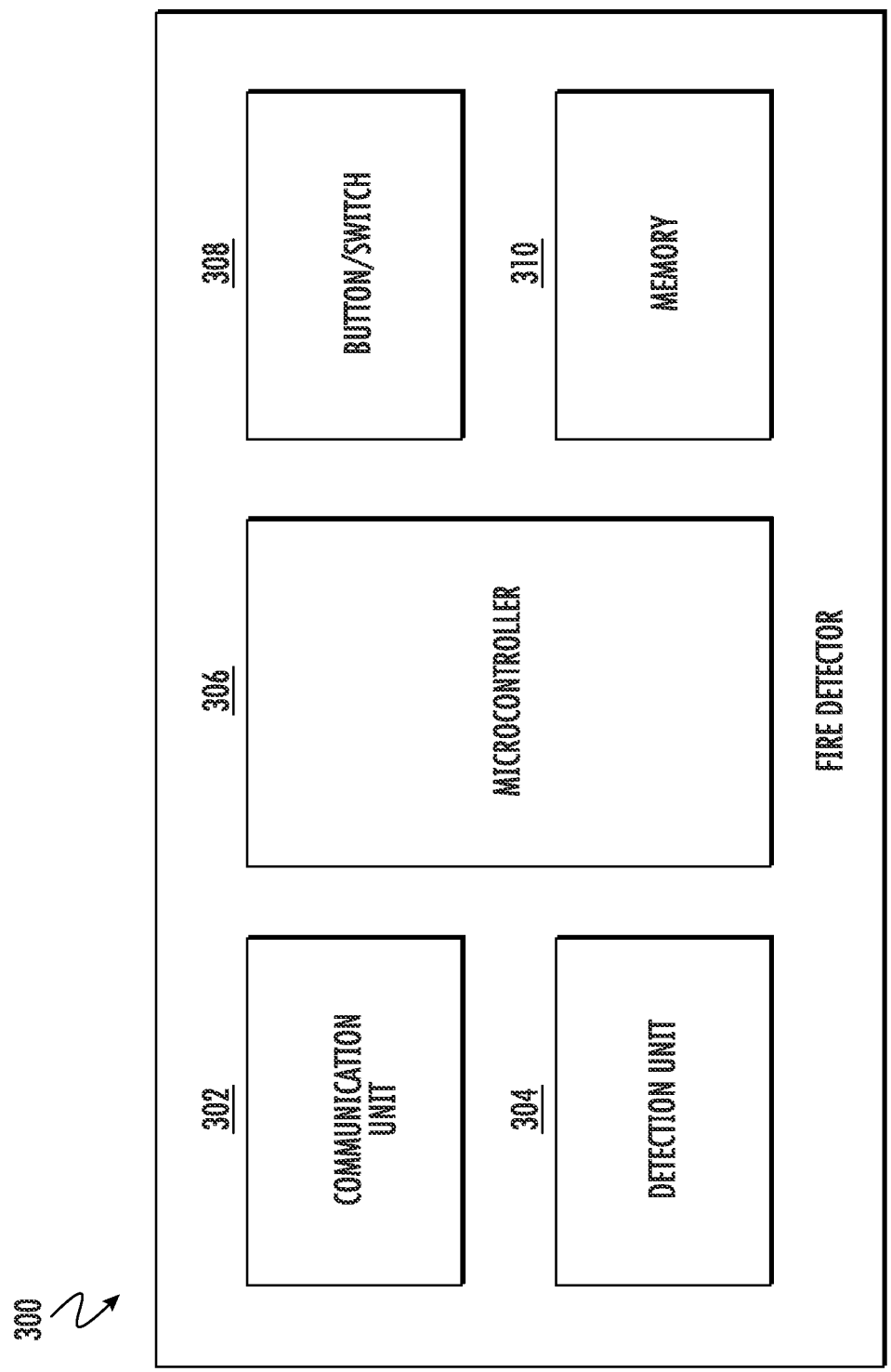
FIG. 3 is an exemplary block diagram showing different components of a detector according to an embodiment of the invention.

FIG. 3 depicts the different components of a detector (300) having same functionalities detectors 100 and 200 described in FIG. 1 and FIG. 2. The detector (300) comprises a communication unit (302), a detection unit (304), a controller or processor (306), a button/switch (308), and a memory (310) which work together to achieve the different functions that are performed by the detector (300). The button/switch (308) is electrically interfaced to the microcontroller (306). The change in status of the button as discussed above is identified by the detection unit (304) and is reported to the microcontroller (306). The microcontroller (306) may issue a notification or an alert in response to the change in status of the button. The change in status of the button may indicate that a blockade is placed on the detector in proximity of the detector. The blockade such as a cap or cover hinders with the normal functioning of the detector. Thus, the microcontroller may issue an audio siren or hooter and the like to alert a concerned user. Alternatively a network module (not shown) may be used to send a message to the concerned user indicating the blockade is placed in proximity of the detector. The microcontroller may also send the alert to the control panel which may further issue the siren or hooters for the concerned user.

In an embodiment of the invention, the detector may be configured to provide identity information, location information and other details on the display unit of the control panel to uniquely identify the anomalous detector.

In this way, a user can seamlessly identify one or more detectors in a fire protection system if a cap or cover is placed on any detector. On receiving the location information and other details on the control panel regarding the anomalous detector, the invention uniquely identifies the detector. This reduces the labor intensive task of finding the anomalous detector. The hazards of fire can be prevented and there is increased safety to life and property. The user is proactively notified of any possible fire accident.

The different units described herein are exemplary. The invention may be performed using one or more units. For example, the tasks executed by the communication unit (302), a detection unit (304), a controller or processor (306), a button/switch (308), and a memory (310) may be performed by a single unit. Alternatively more number of units as described herein may be used to perform the invention.

Figure 4:
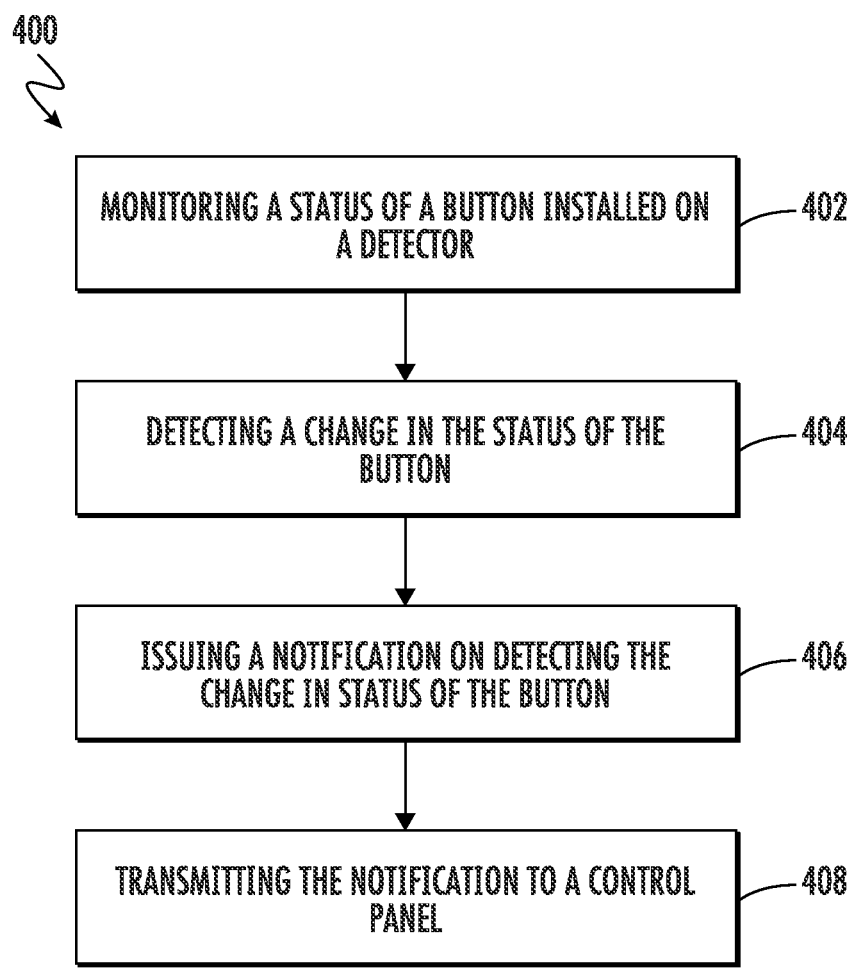
FIG. 4 is an exemplary flowchart illustrating a method to perform the invention according to an embodiment of the invention.

FIG. 4 depicts a flowchart outlining the features of the invention in an embodiment of the invention. The flowchart (400) describes a method being performed for enabling the invention. The method starts at (402) with monitoring a status of the button installed on a detector.

At (404), a detecting unit of the detector detects a change in the status of the button as described above.

The method may further reports the status of the button to the microcontroller. In response to change in status of the button, the microcontroller may issue a notification regarding the change in status of the button at (406).

The notification generated by the microcontroller is transmitted to a control panel (408) as described above.

Another embodiment of the invention discloses a computer readable medium comprising one or more processors and a memory coupled to the one or more processors. The memory stores instructions which are executed by the one or more processors, the one or more processors are operable to monitor detection chamber readings of a plurality of detectors. The instructions are executed to identify whether a cap or cover is placed on the detector. When a cap is placed on the detector a button installed or the detector is depressed or changes status. The instructions are executed to detect change in status of the button. The change in status of the button is reported to the microcontroller. The instructions are executed to issue an alert which may be transmitted to a mobile device of a user directly. Alternatively, the alert generated by the microcontroller is transmitted to a control panel. The control panel may issue an alarm in response to the alert in the form of sirens, hooters and the like.

The one or more processors may be operable to request the configuration for the one or more devices based on the configuration information with instructions to transmit the configuration to a control panel. The control panel may transmit the configuration to each of the one or more devices for configuration.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
monitoring a status of a button installed on a detector;
detecting a change in the status of the button;
issuing a notification on detecting the change in status of the button; and
transmitting the notification to a control panel;
wherein there is a change in status of the button when a cap is placed on the detector;
wherein the cap is designed to be fixed on the detector such that the button changes the status when the cap is fixed with the detector.

2. The method of claim 1, wherein the notification is received by the control panel, wherein the control panel issues an alert in response to the notification.

3. The method of claim 2, wherein the alert issued by the control panel is further transmitted to a mobile device.

4. The method of claim 2, wherein the alert is a message or an audio alarm and is executed on the control panel.

5. The method of claim 1, wherein the button is electrically interfaced with a microcontroller for receiving the change in status of the button.

6. The method of claim 5, wherein the microcontroller is configured to issue the notification based on the detected change in status of the button.

7. The method of claim 1, wherein the notification is transmitted directly to a mobile device.

8. A detector comprising:
- a button fixedly attached to the detector;
- a detection unit for detecting change in status of the button;
- a microcontroller for monitoring the change in status of the button and issuing a notification in response to change in the status of the button; and
- a communication unit communicably coupled with the microcontroller for transmitting the notification;
- wherein there is a change in status of the button when a cap is placed on the detector;
- wherein the cap is designed to be fixed on the detector such that the button changes the status when the cap is fixed with the detector.

9. The detector of claim 8, wherein the notification is received by the control panel, wherein the control panel issues an alert in response to the notification.

10. The detector of claim 8, wherein the button is electrically interfaced with a microcontroller for receiving the change in status of the button.

11. The detector of claim 8, wherein the microcontroller is configured to issue the notification based on the detected change in status of the button.

12. The detector of claim 8, wherein the notification is transmitted directly to a mobile device.

13. The detector of claim 9, wherein the alert is a message or an audio alarm and is executed on the control panel.

14. A computer readable medium comprising one or more processors and a memory coupled to the one or more processors, the memory storing instructions executed by the one or more processors, the one or more processors configured to:
- monitor a status of a button installed on a detector;
- detect a change in the status of the button;
- issue a notification on detecting the change in status of the button; and
- transmit the notification to a control panel;
- wherein there is a change in status of the button when a cap is placed on the detector;
- wherein the cap is designed to be fixed on the detector such that the button changes the status when the cap is fixed with the detector.

15. The computer readable medium of claim 14, wherein the microcontroller is configured to issue the notification based on the detected change in status of the button.

16. The computer readable medium of claim 14, wherein the notification is transmitted directly to a mobile device.

\* \* \* \* \*